UNITED STATES PATENT OFFICE.

RICHARD J. FRISWELL, OF LONDON, ENGLAND, ASSIGNOR OF ONE-HALF TO THE BRITISH URALITE COMPANY, LIMITED, OF SAME PLACE.

MANUFACTURE OF REFRACTORY MATERIALS.

SPECIFICATION forming part of Letters Patent No. 682,140, dated September 3, 1901.

Application filed June 17, 1901. Serial No. 64,980. (No specimens.)

*To all whom it may concern:*

Be it known that I, RICHARD JOHN FRISWELL, a subject of the King of Great Britain, residing at London, England, have invented certain new and useful Improvements in the Manufacture of Refractory Materials, of which the following is a specification.

This invention relates to a process for the production of refractory materials containing asbestos, chalk, and like substances saturated in a silicate—for example, sodium silicate—said process being characterized by the treatment in a closed chamber of saturated sheets or blocks of said substances with moist carbonic-acid gas or with moist and cooled furnace-gases containing carbonic-acid gas, thus depositing colloidal silica in the said substances and subsequently washing out the carbonate and bicarbonate formed.

In carrying out my invention I proceed as follows—that is to say, the articles saturated with sodium silicate and still moist are introduced into a suitable air-tight chamber, and a stream of carbonic-acid gas is passed into the lower portion of the chamber until the said gas is found to be escaping by an exit-tube provided in the upper part of the chamber. The stream of carbonic acid is continued until no more is absorbed by the articles in the chamber, which point may be tested, for example, by observing whether on cutting off the supply of gas and closing the exit from the chamber a vacuum is exhibited on a vacuum-gage attached to the said chamber or not. As soon as this state of saturation is reached a stream of air is passed into the upper part of the chamber, and the excess of $CO_2$ is driven out either into a solution of carbonate of soda requiring regeneration into bicarbonate or into another chamber in which other articles are to be exposed to the action of $CO_2$. When the whole of the $CO_2$ is expelled, the chamber is opened and the articles removed, and the latter are then treated by heating, washing, or other processes necessary to convert them into the finished refractory materials.

Instead of employing $CO_2$ alone for the treatment of articles as above described I may use cooled furnace-gases containing carbonic acid, the same being passed into or through a closed chamber containing the articles saturated with silicate.

What I claim is—

1. A process for the production of refractory materials from asbestos, chalk and like substances by depositing colloidal silica in said substances from a silicate by the action of carbonic-acid gas in a closed chamber, and subsequently washing out the carbonate and bicarbonate so generated, substantially as described.

2. A process for the production of refractory materials from asbestos, chalk and like substances by saturating blocks or sheets of said substances in a solution of sodium silicate, then subjecting said articles to the action of moist carbonic-acid gas in a closed chamber, and subsequently removing by washing, the sodium carbonate and bicarbonate, so generated, substantially as described.

3. A process for the production of refractory materials from asbestos, chalk and like substances by saturating blocks or sheets of said substances in a solution of sodium silicate, then subjecting said articles in a closed chamber to the action of moist and cooled furnace-gases containing carbonic-acid gas, and subsequently removing by washing the sodium carbonate and bicarbonate so generated, substantially as described.

In testimony whereof I have hereunto set my hand in presence of two subscribing witnesses.

R. J. FRISWELL.

Witnesses:
GEORGE HARRISON,
HERBERT A. BEESTON.